Aug. 14, 1951     T. A. GREEN     2,564,219

DRIVE CONNECTION AND STOP

Filed Oct. 3, 1947

INVENTOR.
THOMAS A. GREEN
BY
Raymond D. Jenkins
ATTORNEY

Patented Aug. 14, 1951

2,564,219

UNITED STATES PATENT OFFICE 2,564,219

DRIVE CONNECTION AND STOP

Thomas A. Green, Cleveland Heights, Ohio, assignor to Bailey Meter Company, a corporation of Delaware Application October 3, 1947, Serial No. 777,740

3 Claims. (Cl. 192—116.5)

1

My invention relates to drive connections for power operated mechanisms, and more particularly to yieldable connections for transmitting power from a power means to a driven member.

In order that the strain on the connections to a driven mechanism may not become excessively large when the load on the mechanism is suddenly increased, there is sometimes provided a yieldable driving connection between the mechanism and the power means. The yieldable connection may desirably be so constructed that the ordinary variations in load, such as those produced by changes in speed or in direction of operation of the driving means, do not result in a yielding of the connection. The construction, however, should be such that a yielding of the connection takes place and prevents the loads from increasing to excessive values when the driven mechanism has its motion resisted while it is being driven. The maximum load obtained with such a connection may be kept below a value which would result in an immediate breakage of parts and yet be great enough so that its repeated application would soon cause failure of any ordinary connection.

Instruments for controlling conditions which tend to vary from a desired value frequently include a balanceable bridge network responsive to the condition, and a motor operating when the bridge is unbalanced to control an agent in a manner tending to restore the condition to the desired value. If a resistance bridge is employed in the control of the variable, the motor may operate on unbalance to control the agent and at the same time to vary the relative positions of a potentiometer and its sliding contact in a direction to rebalance the bridge. The relative movements of the potentiometer resistances and its contact must, of course, be limited so that the contact will not move out of engagement with the ends of the resistance. To prevent such overtravel, abutments may be provided for engagement when the limits of the adjustment range have been reached. If the abutments are engaged while the motor is operating at full speed, considerable load is placed on the driving connections. Where the condition is one having a tendency to fluctuate frequently in value, an operation of the motor to its extreme limits may frequently be required. A repeated application

2 of heavy loads on the driving connections by sudden stopping of the motor may soon result in a fracture of the connections. It is therefore desirable that the driving connections be designed so that they will stand up for long periods of time under intermittent applications of a heavy load.

An object of my invention is to provide an improved yieldable connection for transmitting power to a driven member. Another object is to provide an improved yieldable driving connection which will stand up under a repeated application of heavy loads. Yet another object is to provide a driving connection which will drive a driven member with a driving means under ordinary loads and yet yield at greater loads to prevent a breakage of parts. Other objects will appear in the course of the following description.

In the accompanying drawing there is shown for purposes of illustration, one form which my invention may assume in practice.

Figures 1, 2, 3, 4:
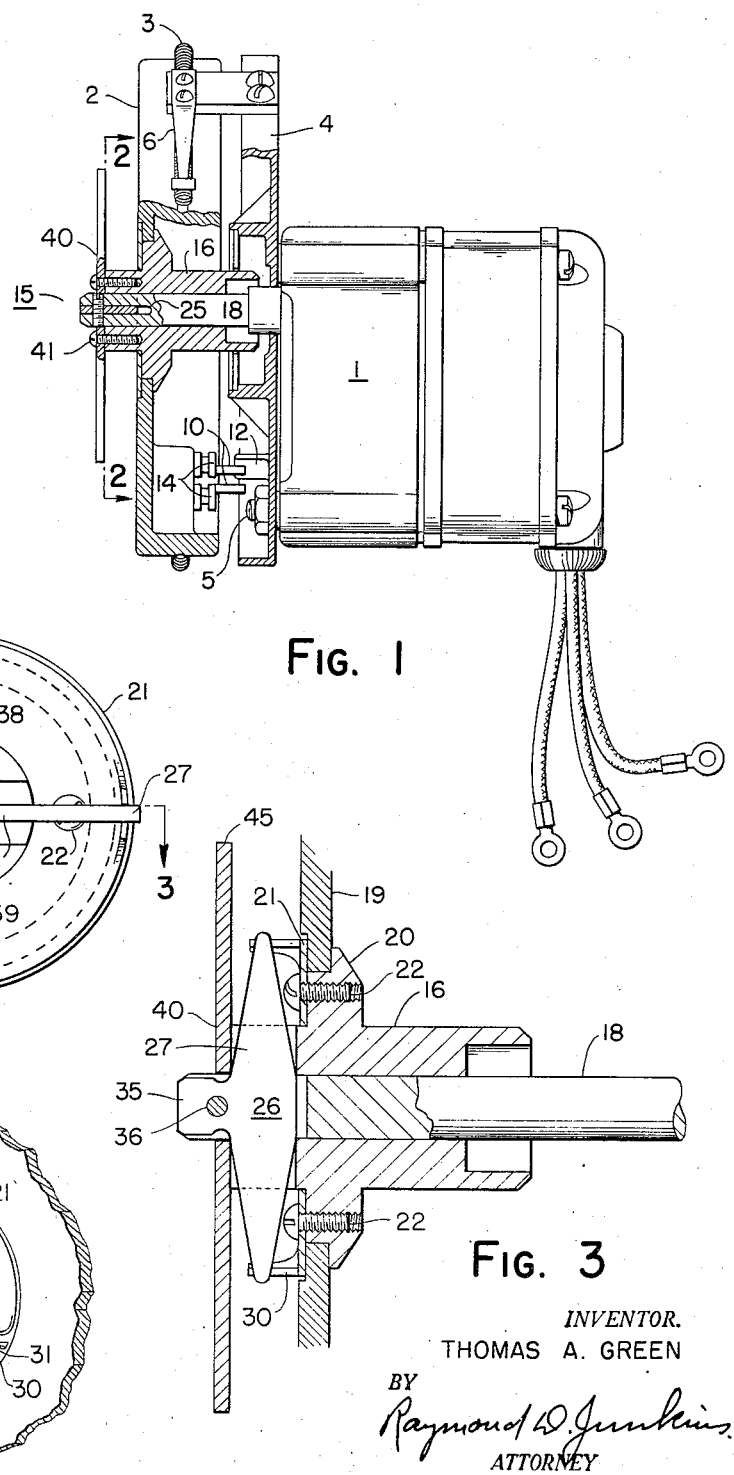
Fig. 1 is a side elevational view with parts shown in section, of a power unit driving a driven member through my improved driving connection.
Fig. 2 is an enlarged view taken substantially on the plane of the line 2—2 of Fig. 1.
Fig. 3 is a sectional view taken on the plane of the line 3—3 of Fig. 2.
Fig. 4 is a perspective view of my improved drive connection.

Referring to the drawing it will be noted that I have shown my invention incorporated in the drive connection between an encased motor 1 and a driven member 2 which carries a resistance wire 3. Attached to a frame member 4 which is fixed to the casing of the motor, as by bolts 5, is a contact member 6 slideably engaging the resistance wire. The contact member and the resistance wire are adapted to be connected into a bridge circuit, not shown, which operates when unbalanced to effect an operation of the motor to position the resistance wire relative to the contact member. In order that the member 2 may not be rotated in either direction so far that the resistance wire is moved out of engagement with the contact member, there are provided projecting members 10 which are adjustably fixed to the member 2 and are engageable with abutment portions 12, one of which is shown, on the frame member 4. The abutment portions are spaced relative to each other in positions to be engaged by the projecting members, and, in order that the maximum angular movement of the member 2 may be varied, the projecting members are shown herein as being arranged eccentrically on elements 14 which are rotatably supported by the driven member. It will be seen that an engagement of one of the projecting members with an abutment portion when the motor is operating at full speed might result in a breaking of some part if a rigid drive connection was provided between the motor and the driven member.

In order to obtain a stalling of the motor without producing loads sufficiently great to break parts of the mechanism, I have provided an improved flexible drive connection, generally designated 15, between the motor and the driven member. The drive connection comprises a hub member 16 which is mounted, as shown in Figs. 1 and 3, upon the drive shaft 18 of the motor. The driven member 2 is mounted upon the hub and has a flange portion 19 which is adapted to be clamped between a hub portion 20 and an annular plate 21 attached to the hub, as by screws 22. When the screws are loosened, the driven member may be adjusted angularly on the hub to any desired position. It may then be clamped in such position by tightening the screws. Formed in the outer end portion of the drive shaft is a diametrical slot 25, and fitting in this slot is a flexible plate 26 having tapered end portions 27 which extend radially from the shaft. Formed on the plate 21 adjacent its periphery and at diametrically opposite points are projecting portions 30 providing slots 31 and 32, as shown in Fig. 4, adapted to receive the outer ends of the plate portions 27. When the hub 16 is rotated upon the shaft to a position in which the slots 31 and 32 are in alignment with the slot 25 in the shaft, the plate 26 may be moved into the slot 25 until its outer end portions 27 are received in the slots 31 and 32.

A portion 35 on the plate is received in the slot 25, and a screw 36 passing through the shaft and the plate holds them against movement relative to each other. Formed on the hub 16 are projecting portions 38 and 39 located at opposite sides of the slots 31 and 32 when the plate 21 is attached to the hub, and these portions project from the face of the hub a distance equal to the width of the plate 26 at points where the latter projects from the sides of the shaft. A plate 40 has an opening receiving the shaft 18, and screws 41 extend through the plate into the hub portions 38, 39 to hold it firmly in place against the latter. The screw 36 extends through the shaft at a point covered by the plate 40 when the latter is attached to the hub so that its escape is prevented. It will be seen that the hub 16 and the plate 40 engage the opposite edges of the plate 26 so that separatory or longitudinal movement of the hub relative to the plate 26 is prevented. Since the plate 26 is held by the screw 36 against movement relative to the shaft 18, then the hub 16 will also be held against movement on the shaft. The hub portions 38 and 39 are spaced apart so as to provide spaces 43 and 44 at opposite sides of the plate 26 sufficiently great to prevent engagement between the hub and the plate on deflections of the latter. The plate 40 is shown herein as having a cam surface 45 at its periphery for actuating suitable mechanism, not shown, to provide an indication or control of the condition causing operation of the motor.

While there is described in this application one form which my invention may assume in practice, it will be understood that this form of the invention is shown merely for purposes of illustration and that it may be modified and embodied in various other forms without departing from its spirit or the scope of the appended claims.

What I claim as new, and desire to secure by Letters Patent of the United States, is:

1. In combination a motor having a casing and a power shaft extending therefrom, a hub rotatably mounted upon said shaft, an annular member supported by said hub, an annular plate fixed to said hub and operating to clamp said annular member thereto, means fixed to the casing of said motor and providing stationary abutments, projecting members fixed to said annular member and engageable with said abutments for limiting rotation of said annular member in opposite directions, a slot formed in the outer end of said power shaft, projecting portions formed on said annular plate adjacent its periphery and providing slots in alignment with the slot in said shaft, a spring plate extending through the slot in said shaft and having its end portions received in the slots provided by the projecting portions formed on said annular plate, and means for fixing said spring plate to said power shaft.

2. In combination a motor having a casing and a power shaft extending therefrom, a hub rotatably mounted upon said shaft, an annular member supported by said hub, an annular plate fixed to said hub and operating to clamp said annular member thereto, means fixed to the casing of said motor and providing stationary abutments, projecting members fixed to said annular member and engageable with said abutments for limiting rotation of said annular member in opposite directions, a slot formed in the outer end of said power shaft, projecting portions formed on said annular plate adjacent its periphery and providing slots in alignment with the slot in said shaft, a spring plate extending through the slot in said shaft and having tapered end portions fitting in the slots provided by the projecting portions formed on said annular plate, said spring plate engaging said hub at its inner edge, portions projecting forwardly from the face of said hub at opposite sides of said spring plate, means fixed to said projecting hub portions and engaging the outer edge of said spring plate, and means for fixing said spring plate to said power shaft.

3. In combination a motor having a casing and a power shaft extending therefrom, a hub rotatably mounted upon said shaft, an annular member supported by said hub, an annular plate fixed to said hub and operating to clamp said annular member thereto, means fixed to the casing of said motor and providing stationary abutments, projecting members fixed to said annular member and engageable with said abutments for limiting rotation of said annular member in opposite directions, a slot formed in the outer end of said power shaft, projecting portions formed on said annular plate adjacent its periphery and providing slots in alignment with the slot in said shaft, a spring plate extending through the slot in said shaft and having tapered end portions fitting in the slots provided by the projecting portions formed on said annular plate, said spring plate engaging said hub at its inner edge, portions projecting forwardly from the face of said hub at opposite sides of said spring plate, an annular member fixed to said projecting hub portions and engaging the outer edge of said spring plate, a forwardly projecting portion on said spring plate received in the slot in said shaft, and a screw extending through said shaft and said forwardly projecting spring plate portion at a point lying in the plane of said last mentioned annular member.

THOMAS A. GREEN.

REFERENCES CITED

The following references are of record in the file of this patent:

UNITED STATES PATENTS

| Number | Name | Date |
|---|---|---|
| 1,756,689 | Jenkins | Apr. 29, 1930 |
| 1,913,288 | Pierce | June 6, 1933 |
| 2,372,096 | Lassmann et al. | Mar. 20, 1945 |
| 2,426,505 | Hill | Aug. 26, 1947 |

FOREIGN PATENTS

| Number | Country | Date |
|---|---|---|
| 511,187 | France | Dec. 18, 1920 |
| 258,060 | Italy | Apr. 3, 1928 |
| 349,027 | Great Britain | May 19, 1931 |
| 439,966 | Great Britain | Dec. 18, 1935 |